US009942203B2

(12) United States Patent
Hopkins et al.

(10) Patent No.: US 9,942,203 B2
(45) Date of Patent: *Apr. 10, 2018

(54) ENHANCED SECURITY WHEN SENDING ASYNCHRONOUS MESSAGES

(71) Applicant: International Business Machines Corporation, Armonk, NY (US)

(72) Inventors: Graham D. Hopkins, Chandler's Ford (GB); Timothy J. Quigly, Basingstoke (GB); Luke D. C. Saker, Eastleigh (GB); Craig H. Stirling, Hedge End (GB); Matthew B. White, Bishop's Waltham (GB)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/672,927

(22) Filed: Mar. 30, 2015

(65) Prior Publication Data
US 2016/0294782 A1    Oct. 6, 2016

(51) Int. Cl.
*H04L 9/32* (2006.01)
*H04L 29/06* (2006.01)
*H04L 12/861* (2013.01)
*H04L 12/58* (2006.01)

(52) U.S. Cl.
CPC .......... *H04L 63/0428* (2013.01); *H04L 49/90* (2013.01); *H04L 51/12* (2013.01); *H04L 63/06* (2013.01); *H04L 63/166* (2013.01); *H04L 63/168* (2013.01)

(58) Field of Classification Search
CPC ............................ H04L 63/0428; H04L 51/12
See application file for complete search history.

(56) References Cited

U.S. PATENT DOCUMENTS

| 6,477,185 | B1 * | 11/2002 | Komi ............... G11B 20/10527 348/423.1 |
| 7,649,998 | B2 | 1/2010 | Harran et al. |
| 7,734,931 | B2 * | 6/2010 | Carter ................... G06F 21/564 709/223 |
| 7,835,726 | B2 | 11/2010 | Qing et al. |

(Continued)

OTHER PUBLICATIONS

Baccala et al., "SSL 3.0 Specification," Connected: An Internet Encyclopedia, Apr. 1997, p. 1-28, http://www.freesoft.org/CIE/Topics/ssl-draft/3-SPEC.HTM, Accessed on Mar. 27, 2015.
Mell et al., "The NIST Definition of Cloud Computing," National Institute of Standards and Technology, Information Technology Laboratory, Oct. 7, 2009, Version 15.
Wagnon, "SSL Renegotiation," SSL Profiles, Jun. 11, 2013, p. 1-8, Part 6, DevCentral Community, F5 Networks, https://devcentral.f5.com/articles/ssl-profiles-part-6-ssl-renegotiation, Accessed on Mar. 27, 2015.

(Continued)

*Primary Examiner* — Mohammed Waliullah
(74) *Attorney, Agent, or Firm* — Robert C. Bunker (57) ABSTRACT

According to one exemplary embodiment, a method for increasing security when sending a plurality of messages over a network connection is provided. The method may include determining if the plurality of messages on a staging queue satisfies a batch threshold value. The method may also include determining a security key with a message destination based on determining that the plurality of messages on the staging queue satisfies the batch threshold value. The method may then include encrypting the plurality of messages based on the determined security key. The method may further include sending the encrypted plurality of messages to the message destination over the network connection.

7 Claims, 6 Drawing Sheets

(56) References Cited

U.S. PATENT DOCUMENTS

| | | | | |
|---|---|---|---|---|
| 2002/0032742 | A1* | 3/2002 | Anderson | H04L 51/24 |
| | | | | 709/206 |
| 2002/0199098 | A1* | 12/2002 | Davis | H04L 63/0281 |
| | | | | 713/160 |
| 2006/0112272 | A1* | 5/2006 | Morioka | H04L 63/0227 |
| | | | | 713/171 |
| 2006/0130069 | A1 | 6/2006 | Srinivasan et al. | |
| 2006/0149965 | A1* | 7/2006 | Sharma | H04L 12/18 |
| | | | | 713/163 |
| 2006/0168023 | A1* | 7/2006 | Srinivasan | H04L 51/14 |
| | | | | 709/206 |
| 2007/0174472 | A1 | 7/2007 | Kulakowski | |
| 2014/0108492 | A1* | 4/2014 | Garza | H04L 67/10 |
| | | | | 709/202 |
| 2016/0294784 | A1 | 10/2016 | Hopkins et al. | |

OTHER PUBLICATIONS

Wikipedia, "OSI model," Wikipedia: the Free Encyclopedia, Last Modified on Mar. 25, 2015, p. 1-7, http://en.wikipedia.org/wiki/OSI_model, Accessed on Mar. 27, 2015.

IBM, "List of IBM Patents or Patent Applications Treated as Related (Appendix P)," Oct. 26, 2015, p. 1-2.

Hopkins et al., "Enhanced Security When Sending Asynchronous Messages," Application and Drawings, filed Oct. 26, 2015, 28 Pages, U.S. Appl. No. 14/922,319.

* cited by examiner

ENHANCED SECURITY WHEN SENDING ASYNCHRONOUS MESSAGES

BACKGROUND

The present invention relates generally to the field of computing, and more particularly to securely sending messages over a network.

Secure Sockets Layer (SSL) enterprise encryption technology or other security protocols may be used to encrypt the communications associated with enterprise messaging software over networks. At the beginning of an SSL session, an SSL key is negotiated between the communicating parties. The key is used to encrypt and decrypt the information flowing over a network connection. For the session to remain secure, the SSL key must not be compromised. To minimize the chance that the SSL keys may be compromised, the SSL keys may be renegotiated at regular time intervals.

SUMMARY

According to one exemplary embodiment, a method for increasing security when sending a plurality of messages over a network connection is provided. The method may include determining if the plurality of messages on a staging queue satisfies a batch threshold value. The method may also include determining a security key with a message destination based on determining that the plurality of messages on the staging queue satisfies the batch threshold value. The method may then include encrypting the plurality of messages based on the determined security key. The method may further include sending the encrypted plurality of messages to the message destination over the network connection.

According to another exemplary embodiment, a computer system for increasing security when sending a plurality of messages over a network connection is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining if the plurality of messages on a staging queue satisfies a batch threshold value. The method may also include determining a security key with a message destination based on determining that the plurality of messages on the staging queue satisfies the batch threshold value. The method may then include encrypting the plurality of messages based on the determined security key. The method may further include sending the encrypted plurality of messages to the message destination over the network connection.

According to yet another exemplary embodiment, a computer program product for increasing security when sending a plurality of messages over a network connection is provided. The computer program product may include one or more computer-readable storage devices and program instructions stored on at least one of the one or more tangible storage devices, the program instructions executable by a processor. The computer program product may include program instructions to determine if the plurality of messages on a staging queue satisfies a batch threshold value. The computer program product may also include program instructions to determine a security key with a message destination based on determining that the plurality of messages on the staging queue satisfies the batch threshold value. The computer program product may then include program instructions to encrypt the plurality of messages based on the determined security key. The computer program product may further include program instructions to send the encrypted plurality of messages to the message destination over the network connection.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for increasing security when asynchronously sending messages from an application to a destination queue. As such, the present embodiment has the capacity to improve the technical field of data transmission security by utilizing asynchronous message sending algorithms to negotiate security keys that are sent with a batch of messages. More specifically, in an asynchronous message transmission system, messages that an application has designated to send to a destination (e.g., destination application or destination queue) may be stored in a queue structure until a sufficient number of messages accumulate to form a batch. Once a batch of messages has accrued, a new security key may be negotiated between the application and destination. The security key may then be sent to the destination along with the batch of messages, thus minimizing the time the security key is exposed to compromise since the security key and batch of messages may be transmitted together.

As described previously, Secure Sockets Layer (SSL) enterprise encryption technology is often used to encrypt the communications associated with enterprise messaging software over networks. At the beginning of an SSL session, an SSL key is negotiated between the communicating parties. The key is used to encrypt and decrypt the information flowing over a network connection. For the session to remain secure, the SSL key must not be compromised. Therefore, the SSL keys may be renegotiated at regular time intervals to minimize the chance of the keys being improperly obtained.

In enterprise systems, such as those at large financial institutions or retailers, the renegotiation of SSL keys is a vitally important part of systems administration. For some Messaging Oriented Middleware solutions, the options for SSL key renegotiation mean that in certain scenarios the SSL may remain the same for an extended period of time, leaving them open for compromise. The default option may be that the SSL key is negotiated when the connection to a back end system (e.g., queue manager, messaging server, message broker, etc.) is created. The same key may remain in place for the life of the connection and therefore the key same key may be used for an extended period of time. The longer an SSL key is used, the greater the risk of the key becoming compromised.

A protection for the SSL key is provided by way of an optional limit for the amount of data which may be sent across the connection under a given SSL key. Once the data limit is met, the SSL key may be renegotiated. If no data limit is specified, the SSL key may also be renegotiated based on a heartbeat event. When a connection has not be used for a predetermined amount of time (as defined in the heartbeat interval property), then the queue manager may flow a small piece of data (i.e., heartbeat) across the connection. After the heartbeat data is sent, the SSL key may be marked for renegotiation the next time a message is sent across the connection.

Renegotiating SSL keys based on a data limit or heartbeat may still create security risks by using the SSL keys for extended periods of time thus increasing the risk for the SSL key to become compromised. For example, if a heartbeat mechanism is used to renegotiate SSL keys and data is consistently sent for an extended period of time, the same SSL keys may be used for extended period of time and create a security risk.

In a different scenario, the SSL key may also be used long enough to provide security risks if a data limit is used to renegotiate the SSL key, the data limit is not reached for an extended period of time, and the message cadence (i.e., rate at which messages are being sent across the connection) is such that the heartbeat interval is never reached. This scenario may occur in the event that there is a high frequency of small messages flowing across the connection. The flow of messages prevents the heartbeat interval from being reached, yet the small data size of the messages means that any data limit might take a long time to be reached.

Therefore, it may be advantageous to, among other things, provide a way to consistently renegotiate SSL keys after a short period of time to minimize the possibility of the SSL keys being improperly obtained and used by renegotiating SSL keys each time a batch of messages is sent.

An asynchronous message send functionality for messages, such as the asynchronous send functionality available in IBM® WebSphere® MQ Version 8.0 (IBM, WebSphere and all IBM-based trademarks and logos are trademarks or registered trademarks of International Business Machines Corporation and/or its affiliates) using the Java Message Service Specification (JMS) 2.0 application program interface (API), may be utilized in conjunction with the technique of batching messages together for sending messages across a network. An asynchronous message send functionality may allow clients to send messages asynchronously which may permit the JMS provider to perform part of the work involved in sending the message in a separate thread.

For example, a send queue processor thread and a staging queue architecture may be used to implement asynchronous messaging behavior. When an application thread, which is sending the message, performs an asynchronous send on the message, the message is put onto the staging queue. The application thread then returns to the application logic. The application thread does not have to wait for the full send operation to complete. Once the message is on the staging queue, the send queue processor thread takes ownership of the message and handles he message's ultimate delivery to the final destination or destination queue.

According to at least one embodiment, the asynchronous send functionality may be employed to use a successful creation of a batch of messages on the staging queue event as the trigger to negotiate a new security key (e.g., SSL key). The batch of messages can then be sent to the destination under the new key. In this way, every batch of messages may be sent to the destination under its own brand new security key. Using this approach, the amount of time between the security key being negotiated and the last message being sent across the network connection using the key may be short as possible. This may drastically reduce the potential for keys to be compromised (e.g., by hacking). The above approach may also be more deterministic as key renegotiation may be undertaken due to a distinct batch of messages being ready to be sent across the connection as opposed to waiting for a heartbeat to occur or a data limit to be reached.

Figure 1:
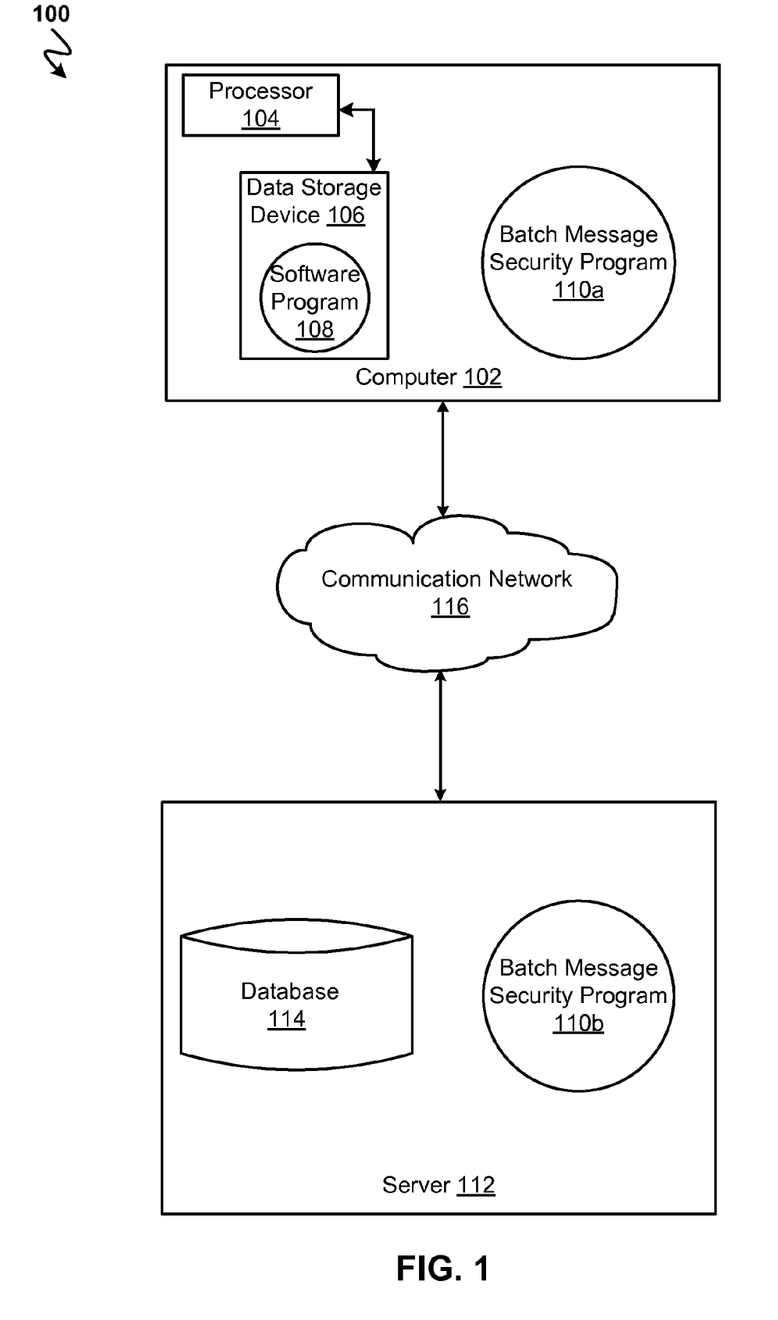
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a batch message security program 110a. The networked computer environment 100 may also include a server 112 that is enabled to run a batch message security program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the batch message security program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the batch message security program 110a, 110b (respectively) to increase the security of messages sent from an application to a destination by negotiating security keys each time a batch of messages is transmitted. The batch message security program 110a and 110b is explained in more detail below with respect to FIG. 2.

Figure 2:
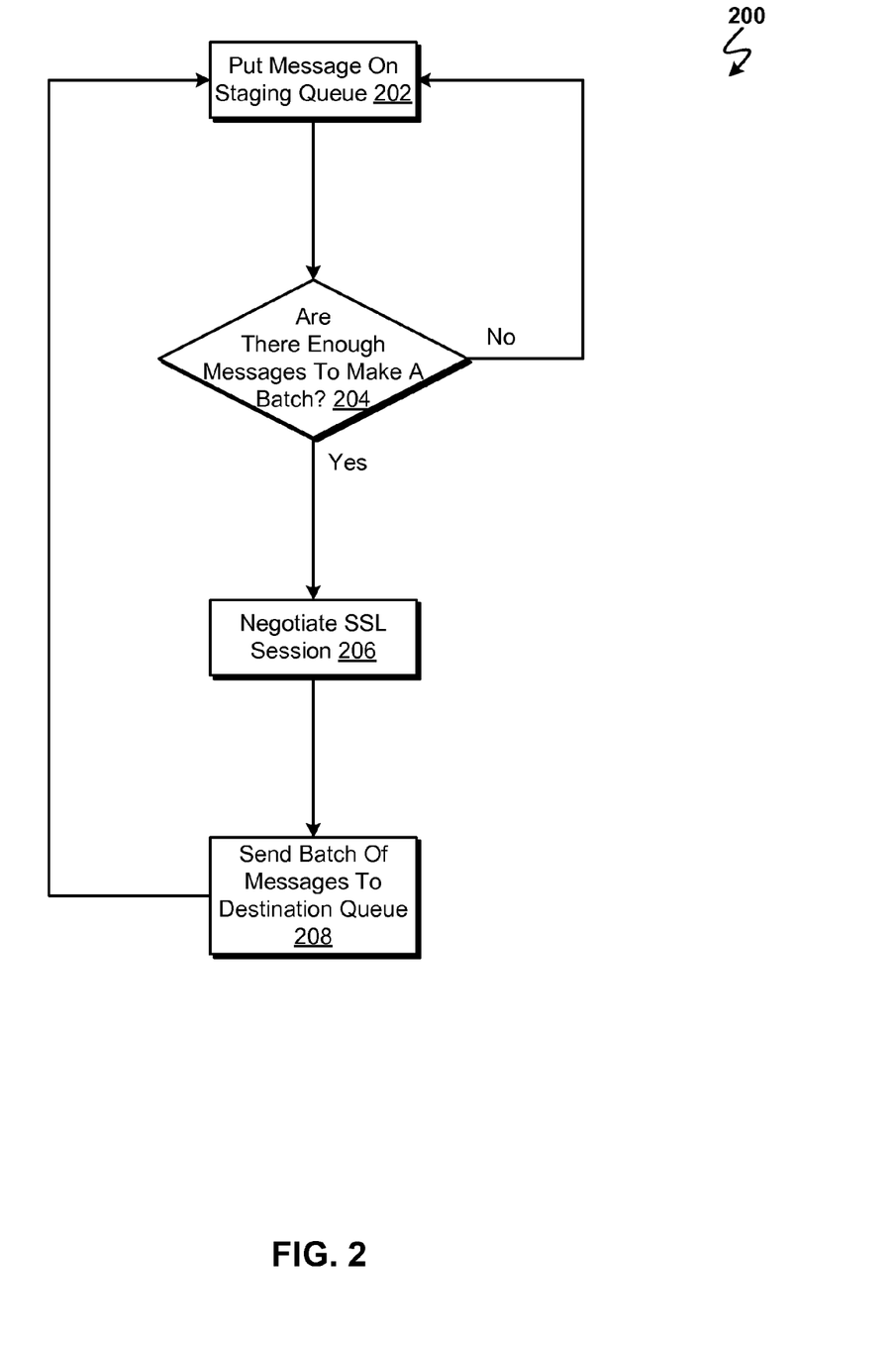
FIG. 2 is an operational flow chart illustrating a process for enhanced asynchronous message sending security according to at least one embodiment.

Referring now to FIG. 2, an operational flow chart illustrating the steps 200 used by an batch message security program 110a and 110b (FIG. 1) according to at least one embodiment is depicted.

Figure 4:
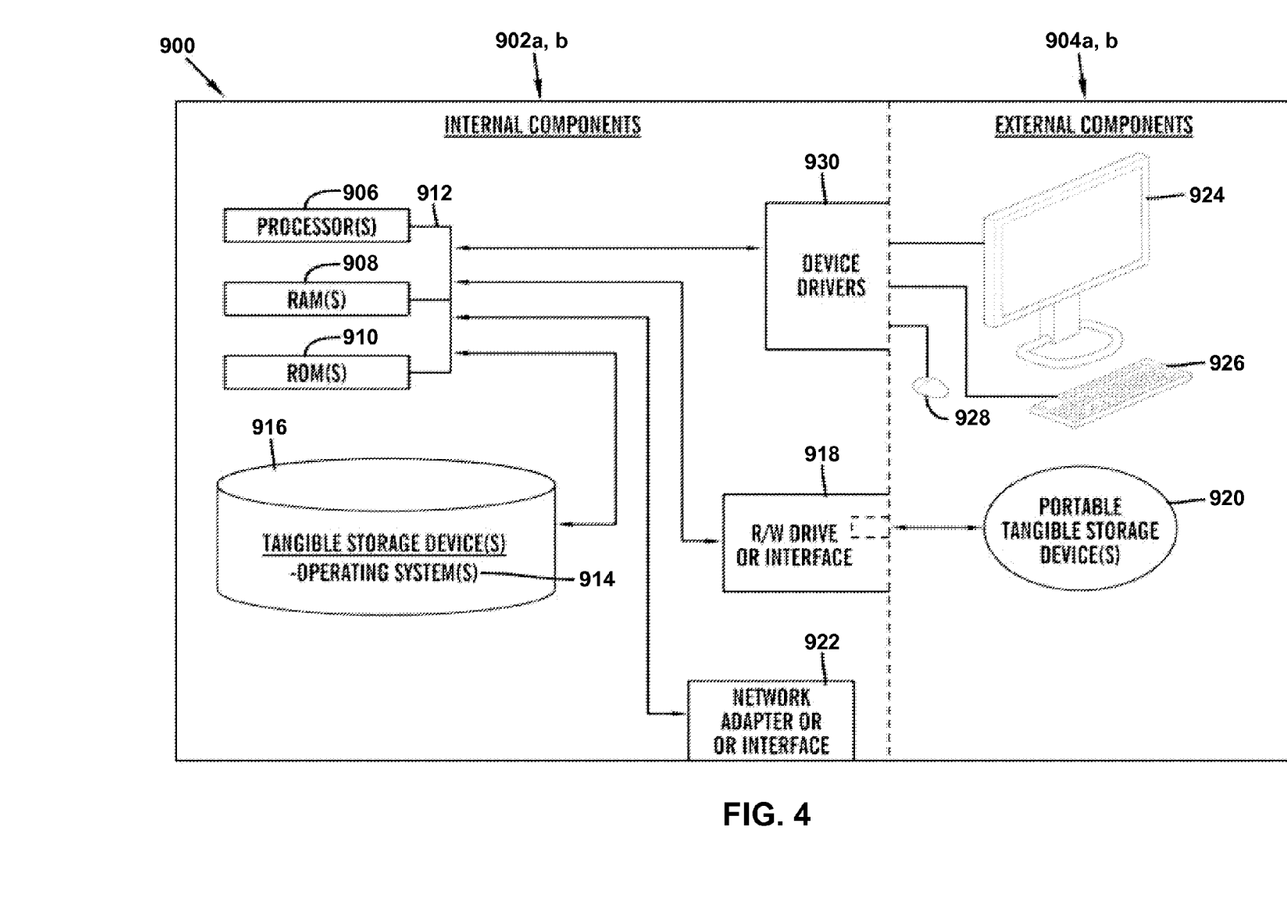
FIG. 4 is a block diagram of internal and external components of computers and servers depicted in FIG. 1 according to at least one embodiment.

At 202 a message from an application may be put on a staging queue. According to at least one embodiment, a client-side application, such as software program 108 (FIG. 1) (e.g., web browser), may generate data (e.g., consumer form data) during execution to send to a destination (e.g., database manager application). The data that the application intends to send may be sent to the staging queue for asynchronous delivery to the destination by an application thread. Following the asynchronous messaging model, the application may continue execution without committing more resources to sending the data to the destination. The staging queue may be managed by a client-side entity, such as a queue manager and the staging queue may be implemented as a data structure stored in client-side memory, such as RAM (e.g., 908: FIG. 4).

Next, at 204, it may be determined if there are enough messages in the staging queue to constitute a batch of messages. According to at least one embodiment, the number of messages needed to constitute a batch of messages may be defined by the application. For example, the application may specify a number of messages that constitutes a batch of messages (e.g., five messages), a certain amount of time that elapses (e.g., after four minutes all messages in the staging queue will be considered a batch of messages), etc.

Other policies may be used to determine when the messages in the staging queue constitute a batch of messages. For example, the messages in the staging queue may be designated as a batch of messages if the network connection between the application and destination is idle and therefore no significant impact to performance may be incurred from sending the batch of messages. The amount of memory assigned to the staging queue may determine when there are enough messages to constitute a batch of messages. For example, if after adding a message to the staging queue, the send queue processor thread determines that there is only ten percent of the memory allocated to the staging queue that remains free, the send queue processor thread may determine that there are enough messages to constitute a batch of messages. Additionally, combinations of policies may be used to determine if the messages in the staging queue constitute a batch of messages.

If it was determined at 204 that there are not enough messages in the staging queue (or other policy) to constitute a batch of messages, the queue manager may return to 202 wait for another message to be added to the staging queue.

However, if it was determined at 204 that there is enough messages in the staging queue to constitute a batch of messages, the SSL, Transport Layer Security (TSL), or other security protocol session may be negotiated (or renegotiated) in anticipation of sending the batch of messages at 206. According to at least one embodiment, the send queue processor thread may negotiate the security protocol session (e.g., SSL) with the destination (e.g., destination application). The security protocol negotiation may follow the process specified by the security protocol. For example, if the application and destination both use the SSL protocol, the send queue processor thread may negotiate with the destination on behalf of the application by initiating an SSL handshake. After the negotiating the SSL key for the batch of messages with the destination, the send queue processor thread receive the SSL key from the destination for use in encrypting the batch of messages.

Then, at 208, the batch of messages may be encrypted by the new security key and sent to the destination. According to at least one embodiment, the send queue processor thread may transmit the batch of messages to the destination according to existing asynchronous messaging methods (e.g., JMS 2.0) and the batch of messages may be encrypted using the security key that was received before at 206. For example, the send queue processor thread may encrypt a batch of messages using the new SSL key generated from negotiating with a destination application. The encrypted batch of messages may then be sent to a destination queue using a put command for each message. The queue manager may then return to 202 wait for another message to be added to the staging queue.

Figure 3:
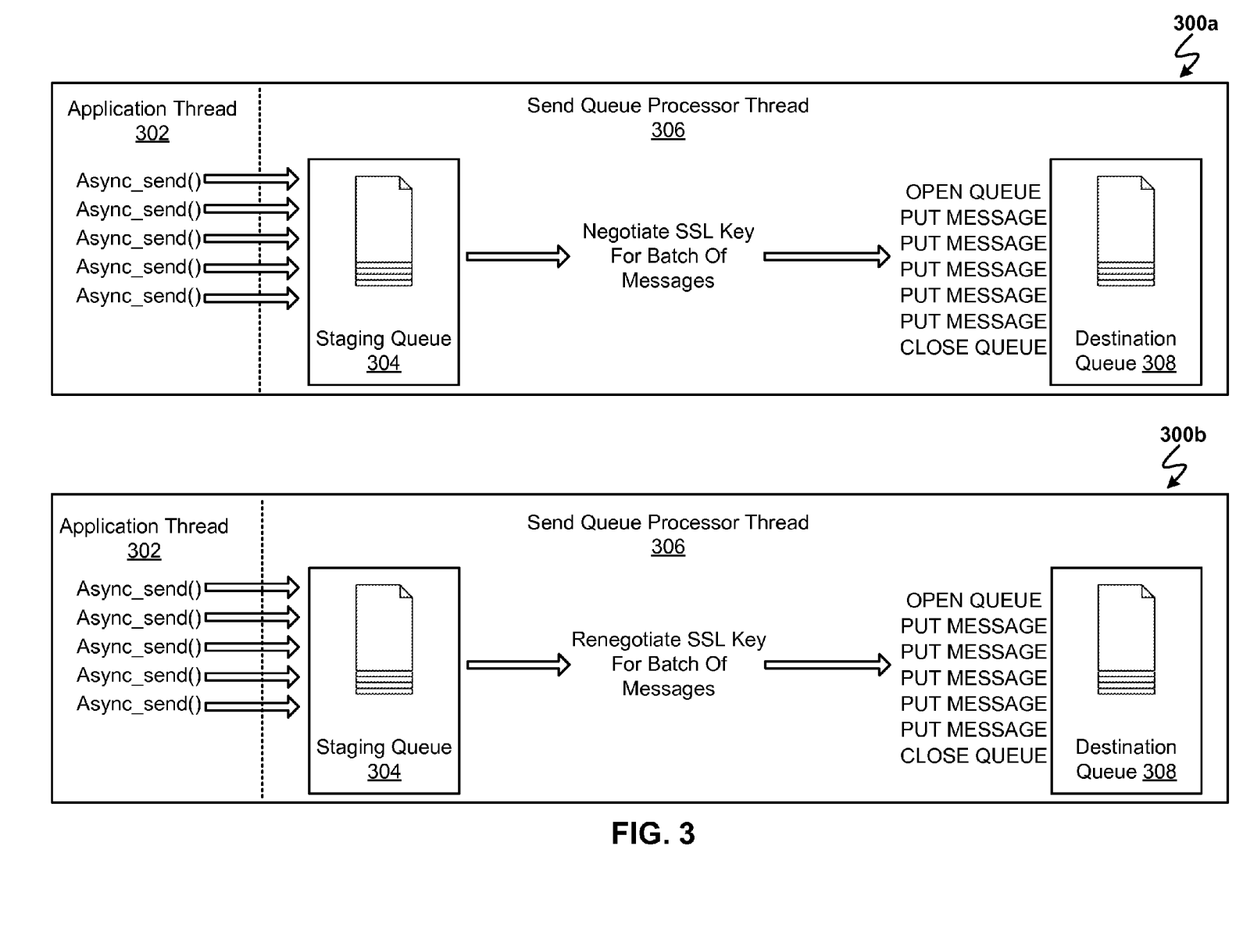
FIG. 3 is a flow diagram illustrating execution flows according to at least one embodiment.

Referring now to FIG. 3, a flow diagram illustrating two example execution flows (first execution flow 300a and second execution flow 300b) of the batch message security program 110a and 110b (FIG. 1) according to at least one embodiment is depicted.

An application thread 302 associated with an application (e.g., web browser) may execute until the application thread 302 reaches a point when the application thread 302 will send data (e.g., user form data) to a destination application (e.g., database management). The application thread 302, may then use a function call, such as Asnyc_send( ), to send data as messages in an asynchronous messaging environment.

In the first execution flow 300a, the application thread 302 sends data messages to the staging queue 304 stored in local RAM by invoking Asnyc_send( ) function calls. The data messages are then stored in the staging queue 304 as previously described in step 202 (FIG. 2).

With the data the application thread 302 sent stored on the staging queue 304, the application thread 302 may proceed with execution and leave further message handling to a local queue manager in an asynchronous message model (e.g., JMS 2.0). The local queue manager, having ownership of the staging queue 304, may run a send queue processor thread 306 to handle message delivery from the staging queue 304.

Next, the send queue processor thread 306 will determine, after each message is put on the staging queue 304, if the number of messages in the staging queue meets a threshold value that indicates that a batch of messages has been formed. As described previously, various ways may be used to determine how many messages constitute a batch of messages. If the threshold value is a number of messages, such as five messages, the send queue processor thread 306 will determine that there is a batch of messages present in the staging queue 304 once there are five messages stored in the staging queue 304. In the first execution flow 300a, the application thread 302 sends five messages. Therefore, after the fifth message is placed on the staging queue 304, the send queue processor thread 306 will determine that the number of messages on the staging queue 304 constitutes a batch of messages as described previously in step 204 (FIG. 2).

Then, the send queue processor thread 306 will negotiate an SSL key for the batch of messages with the back end system (e.g., queue manager, messaging server, message broker, etc.) as described previously in step 206 (FIG. 2) when the send queue processor thread 306 and the back end system both use the SSL protocol for security.

Once the send queue processor thread 306 has completed SSL key negotiation and has an SSL key, the send queue processor thread 306 will then encrypt the batch of messages using the SSL key and send the batch of messages as described previously in step 208 (FIG. 2). The send queue processor thread 306 will prepare to send the batch of messages by accessing a destination queue 308 owned by the back end system with an open queue call. Thereafter, the send queue processor thread 306 sends each encrypted message in the batch of messages to the destination queue 308 with a put message call. Once the batch of messages has been sent and put on the destination queue 308, the send queue processor thread 306 will use a close queue call to finish sending the batch of messages.

The application thread 302 will have continued execution while the send queue processor thread 306 handled sending the batch of messages to the destination queue 308. As the application thread 302 continues execution, the application thread may again need to send data messages the destination application having the destination queue 308 as depicted in the second execution flow 300b.

The scenario depicted in the second execution flow 300b proceeds similarly to the first execution flow 300a described previously. However, the once the send queue processor thread 306 has determined that there are enough messages on the staging queue 304 to constitute a batch of messages, the send queue processor thread 306 will renegotiate for a new SSL key with the back end system. Thereafter, the messages in the batch of messages will be encrypted using the new SSL key. Thus, the messages in the batch of messages will have enhanced security since the SSL key used to encrypt the messages has not been used before and the key is not in use long enough to allow an opportunity to compromise the SSL key.

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the batch message security program 110a (FIG. 1) in client computer 102 (FIG. 1) and the batch message security program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the batch message security program 110a and 110b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the batch message security program 110a (FIG. 1) in client computer 102 (FIG. 1) and the batch message security program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the batch message security program 110a (FIG. 1) in client computer 102 (FIG. 1) and the batch message security program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
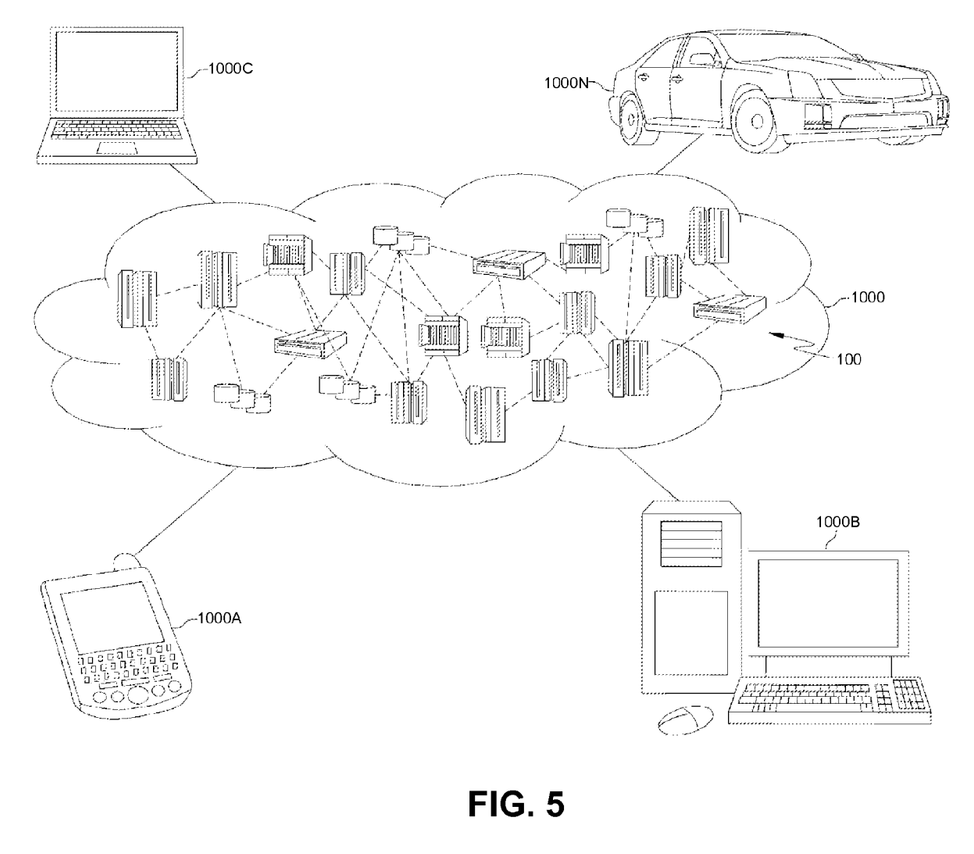
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
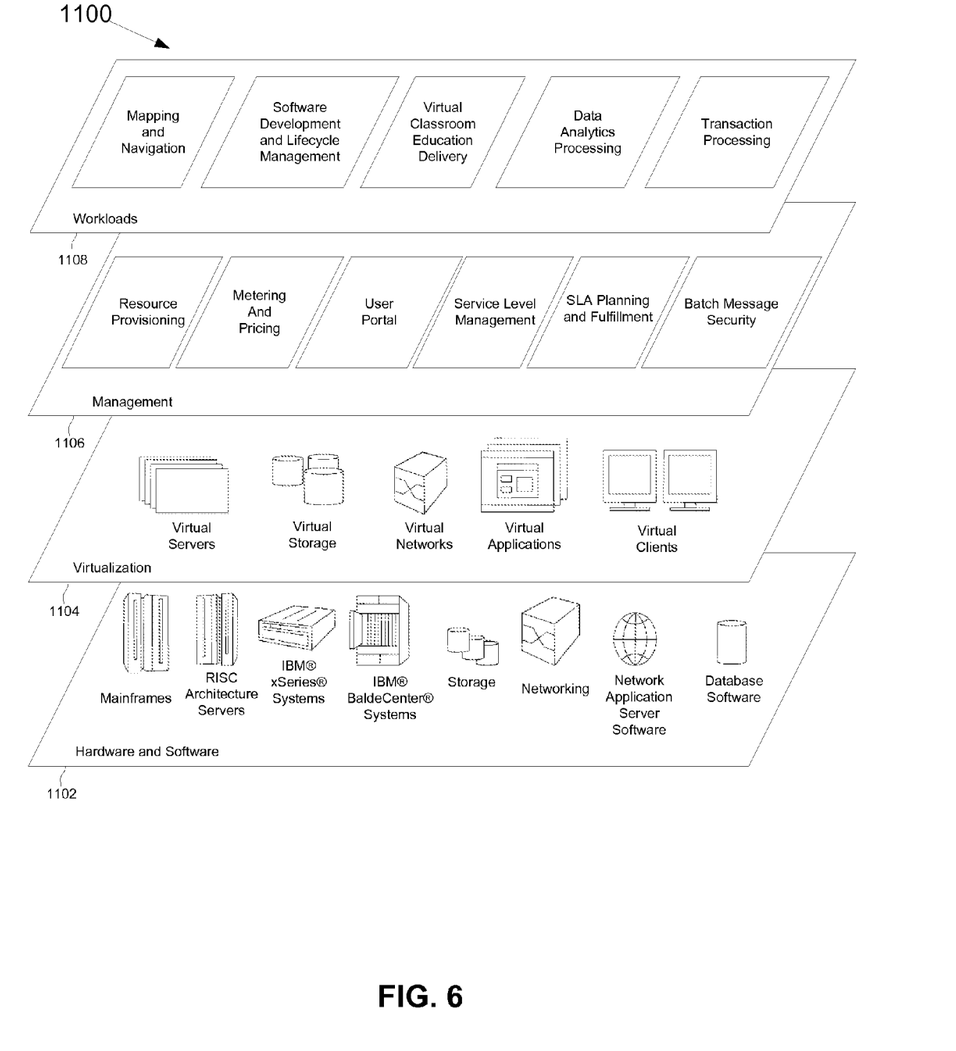
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Batch message security provides enhanced security for sending messages from an application to a destination by negotiating security keys each time a batch of messages is sent and thereby reducing security risks by minimizing the time a malefactor may have to compromise the security key.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for increasing security when sending a plurality of messages over a network connection, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, within a client device, the plurality of messages asynchronously from an application thread running on the client device;
enqueuing the received plurality of messages in a staging queue within the client device, wherein the staging queue has an amount of memory assigned to the staging queue;
determining that the plurality of messages in the staging queue satisfies a batch threshold value, wherein the batch threshold value is based on the amount of memory assigned to the staging queue;
determining a new security key with a message destination based on determining that the plurality of messages on the staging queue satisfies the batch threshold value;
encrypting the enqueued plurality of messages based on the determined new security key, wherein encrypting the plurality of messages based on the determined new security key comprises encrypting each message within the plurality of messages based on the determined new security key; and
sending the encrypted plurality of messages as a batch from the client device to the message destination over the network connection, wherein a subsequent plurality of messages is encrypted using a different security key.

2. The computer system of claim 1, wherein message destination comprises a destination queue or a destination application.

3. The computer system of claim 1, wherein the determined security key is a Secure Socket Layer (SSL) key or a Transport Layer Security (TSL) key.

4. The computer system of claim 1, wherein sending the plurality of messages comprises sending each message within the plurality of messages in immediate succession.

5. A computer program product for increasing security when sending a plurality of messages over a network connection, comprising:
one or more non-transitory computer-readable storage medium and program instructions stored on at least one of the one or more tangible storage medium, the program instructions executable by a processor, the program instructions comprising:
program instructions to receive, within a client device, the plurality of messages asynchronously from an application thread running on the client device;
program instructions to enqueue the received plurality of messages in a staging queue within the client device, wherein the staging queue has an amount of memory assigned to the staging queue;
program instructions to determine that the plurality of messages in the staging queue satisfies a batch threshold value, wherein the batch threshold value is based on the amount of memory assigned to the staging queue;
program instructions to determine a new security key with a message destination based on determining that the plurality of messages on the staging queue satisfies the batch threshold value;
program instructions to encrypt the enqueued plurality of messages based on the determined new security key, wherein encrypting the plurality of messages based on the determined new security key comprises encrypting each message within the plurality of messages based on the determined new security key; and
program instructions to send the encrypted plurality of messages as a batch from the client device to the message destination over the network connection, wherein a subsequent plurality of messages is encrypted using a different security key.

6. The computer program product of claim 5, wherein message destination comprises a destination queue or a destination application.

7. The computer program product of claim 5, wherein sending the plurality of messages comprises sending each message within the plurality of messages in immediate succession.

\* \* \* \* \*